United States Patent [19]
Patterson

[11] 3,758,931
[45] Sept. 18, 1973

[54] WHEEL ASSEMBLY METHOD AND APPARATUS

[75] Inventor: Richard A. Patterson, St. Paul, Minn.

[73] Assignee: The Huffman Manufacturing Company, Miamisburg, Ohio

[22] Filed: Dec. 29, 1971

[21] Appl. No.: 213,342

[52] U.S. Cl. .......... 29/159.02, 29/200 R, 20/200 P, 29/208 R
[51] Int. Cl. ......................... B21f 39/00, B21k 1/34
[58] Field of Search .................... 29/208 R, 159.02, 29/159 R, 200 P, 200 R

[56] References Cited
UNITED STATES PATENTS

| | | | |
|---|---|---|---|
| 1,901,457 | 3/1933 | Kranz et al. ................. | 29/159.02 X |
| 1,921,223 | 8/1933 | Eksergian ....................... | 29/159.02 |
| 1,933,956 | 11/1933 | Ash.................................. | 29/159.02 |
| 1,969,108 | 8/1934 | Tarbox............................. | 29/159.02 |
| 3,507,027 | 4/1970 | Jaulmes........................... | 29/159.02 |

*Primary Examiner*—Richard J. Herbst
*Assistant Examiner*—V. A. Dipalma
*Attorney*—William R. Jacox et al.

[57] ABSTRACT

A bicycle wheel rim is placed on a fixture mounted on a rotary indexing transfer table, and a plurality of spokes are attached to a hub which is supported by the fixture in concentric relation with the rim. The table indexes, and the hub and attached spokes are shifted by the fixture to a rotatable spoke orienting head which grips and spins the hub causing the spokes to be centrifugally positioned in substantially uniform angularly spaced relation. The outwardly extending spinning spokes are picked up by corresponding magnets carried by the rotating orienting head, and an inner group of spokes are shifted into crossing relation with an outer group of spokes. The hub and crossed spokes are then transferred to the table fixture where the oriented spokes are positioned in outwardly converging relation aligned with corresponding holes formed in the rim. The table indexes again to move the fixtured hub, rim and angularly positioned crossed spokes to a device which simultaneously extends corresponding nut-like threaded fasteners or nipples through the holes in the rim and tightens the nipples onto the end portions of the spokes to a predetermined uniform torque. The table then indexes to transfer the assembled wheel to a discharge station where the wheel is ejected from the table fixture by pins which extend upwardly to press the rim upwardly from the fixture.

24 Claims, 12 Drawing Figures

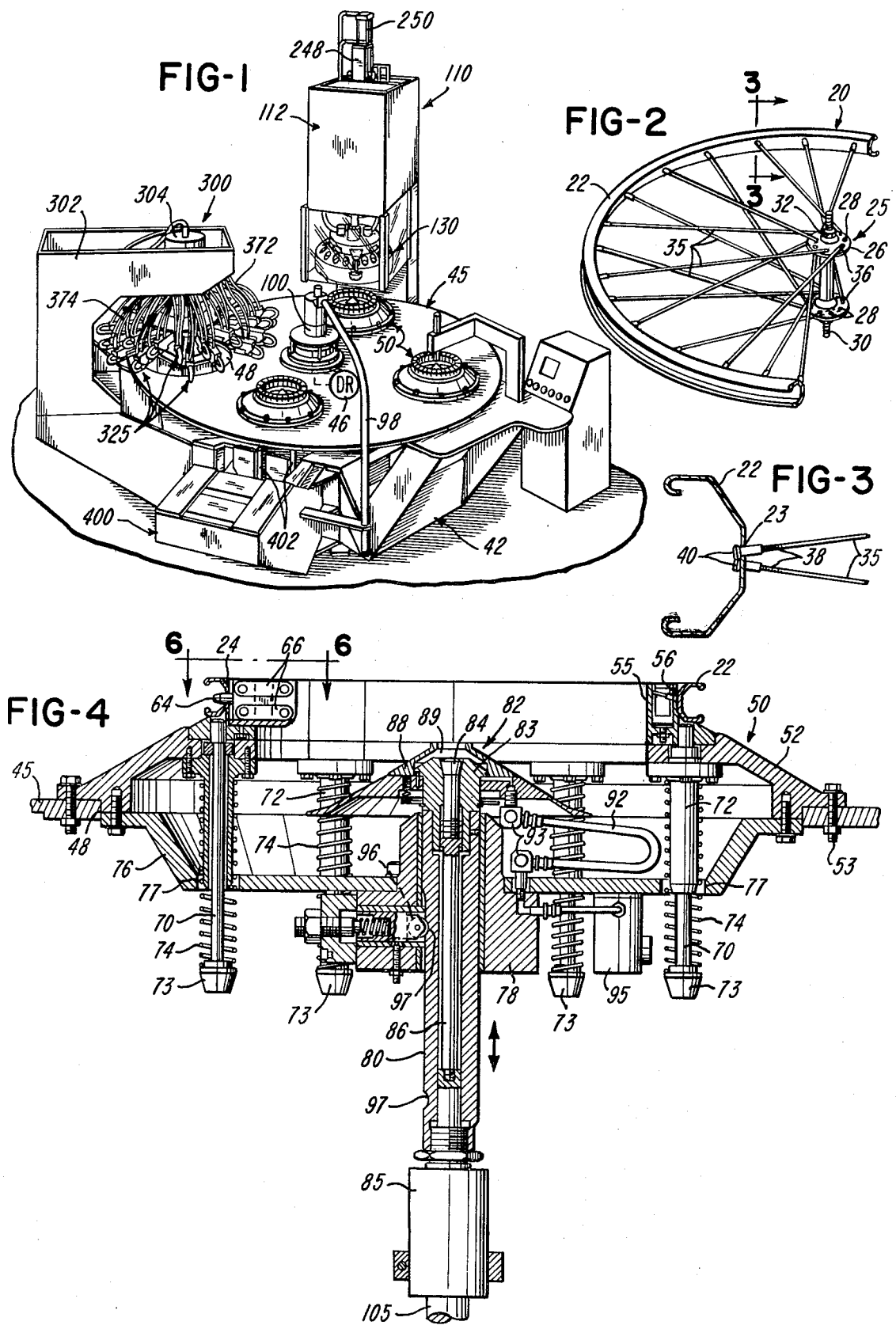

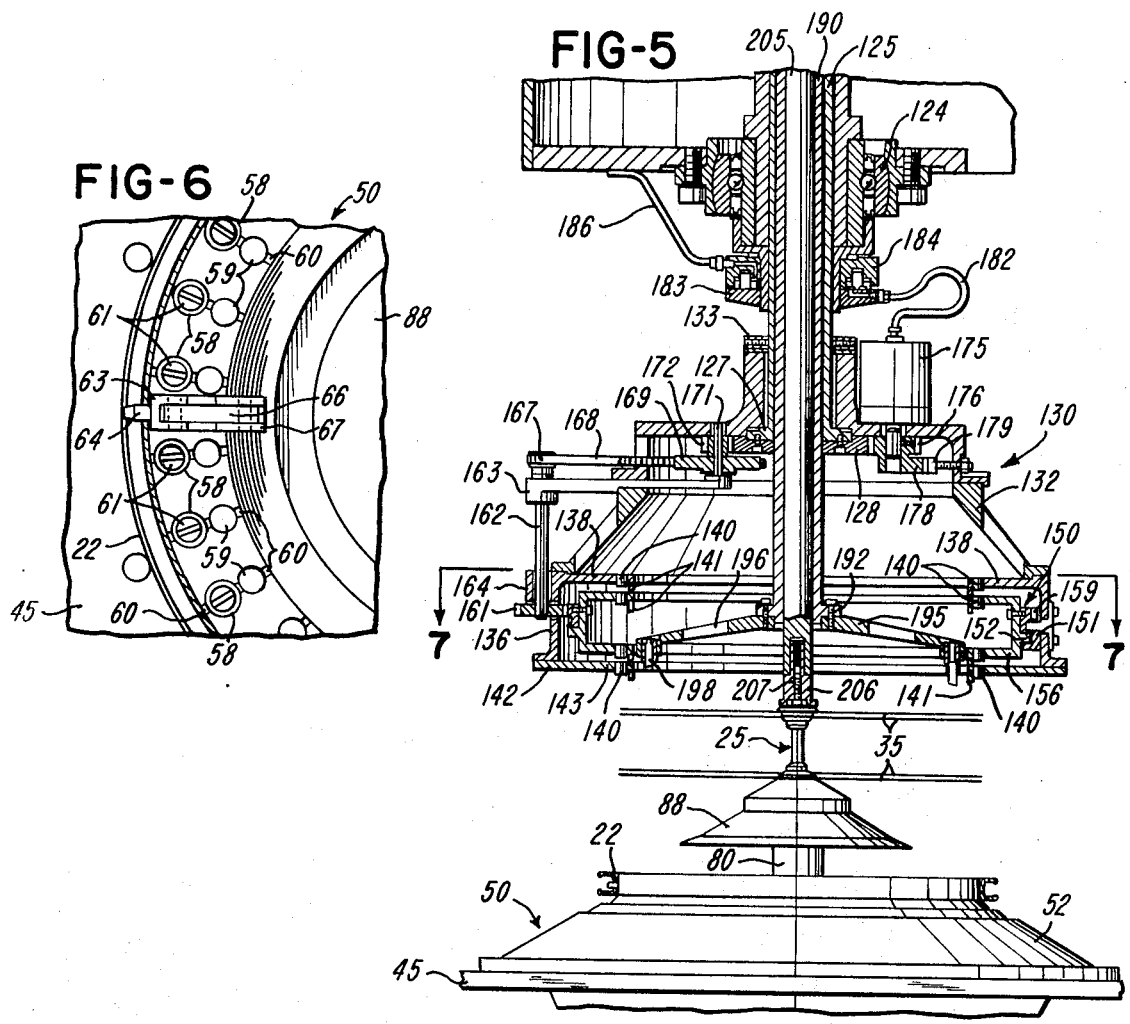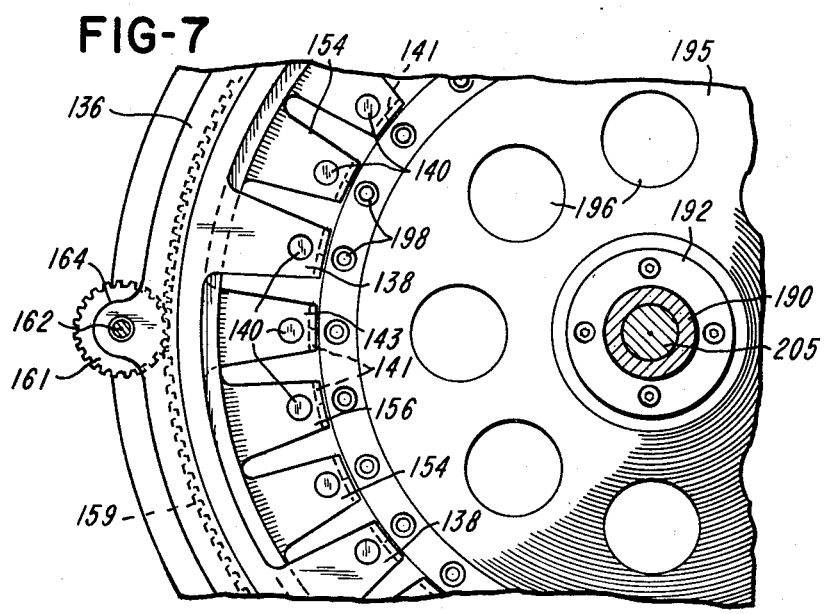

WHEEL ASSEMBLY METHOD AND APPARATUS

BACKGROUND OF THE INVENTION

In the manufacture of bicycle and motorbike wheels, a tubular hub, having flanges on each end, is rotatably mounted on a threaded shaft by a pair of antifriction bearings and suitable lock nuts, and each of the hub flanges has circumferentially spaced holes through which wire spokes are threaded or laced. Commonly, each of the spokes has a right angle end portion which extends through a hole in one of the hub flanges, and that end portion of the spoke has an enlarged head to prevent the end portion from being pulled through the hole. Some of the spokes extend from the inner sides of the hub flanges to the concentric annular rim, and another group of spokes extend from the outer sides of the hub flanges to the rim. The inner and outer spokes connected to each hub flange extend tangentially in opposite directions so that the outer spokes cross the inner spokes to provide the wheel assembly with maximum strength and rigidity. Each of the spokes has an outer threaded end portion. A threaded fitting or nipple extends inwardly towards the center of the wheel through a corresponding hole in the rim and is tightened onto the spoke to a predetermined torque to draw its radially outward head against the rim, so that all of the spokes are placed in tension and cooperate to hold the rim in a circular condition.

Usually, each of the spokes is manually laced through a hub flange hole and is held in alignment with the corresponding hole within the rim while the nipple is manually threaded onto the end portion of the spoke. While various forms of fixtures have been used to locate the hub and rim in concentric relation, substantial time and labor are required for manually orientating and positioning the spokes and for fastening the spokes to the rim. This time and labor significantly increases the manufacturing cost of the assembled wheel.

SUMMARY OF THE INVENTION

The present invention is directed to a method and apparatus for rapidly and automatically assembling a wheel which includes a plurality of spokes for connecting a hub member to a concentric annular rim. The invention provides an important feature of significantly reducing the time and the manual labor required for assembling a wheel and, in addition, provides for producing a wheel wherein the spokes are uniformly tensioned, and the rim is positioned precisely true and concentric with an axle extending through the hub.

In accordance with a preferred embodiment of the invention which is ideally suited for producing a large volume of bicycle wheels, an annular metal rim is seated on one of a series of fixtures mounted on a rotary indexing table. A hub having parallel spaced end flanges is mounted on a threaded axle which is secured to a loading device, and a plurality of wire spokes are laced into corresponding holes formed within the hub flanges, In a conventional manner, one group of spokes extends from the inner faces of the hub flanges, and another group of spokes extends from the outer faces of the flanges. The hub and attached spokes are transferred to the table fixture where the lower end of the axle is gripped by a collet chuck located in the center of the fixture concentric with the support for the wheel rim.

The transfer table is indexed, and the concentric rim and hub and the freely depending spokes, are shifted to a spoke orientating device wherein the upper end portion of the hub is gripped by a drive hub on the lower end portion of a vertical shaft. The wheel hub and spokes are rotated or spun at a speed sufficient to cause the spokes to extend centrifugally outwardly from the hub flanges with the spokes being positioned generally radially relative to the hub flanges and in uniform angularly spaced relation. During spinning, the spokes lie in four planes, and each spoke has an unique rotational position because no two spoke holes are in alignment along the hub axis, the holes in one flange being centered between the holes in the other. While the hub and spokes are spinning, the spokes are picked up by corresponding magnets which are arranged at four different levels corresponding to the vertical spacing of the spokes extending from the inner and outer faces of both hub flanges.

The group of magnetically retained spokes extending from the inner faces of the hub flanges, are then rotated or shifted relative to the group of spokes extending from the outer faces of the hub flanges so that the spokes are arranged in uniformly spaced crossing relation. The crossed spokes are engaged by corresponding magnets carried by a transfer disc which moves axially with the hub support shaft to transfer the hub and orientated spokes back to the table fixture where the spokes are tilted or positioned in outwardly converging relation and in alignment with corresponding holes within the surrounding rim.

The transfer table is indexed again, and the hub and oriented spokes are transferred by the fixture to a device which simultaneously extends threaded fasteners or nipples through the rim holes and threads the nipples onto the aligned outer end portions of the spokes until a predetermined uniform torque is attained, thereby completing the assembly of the wheel. The transfer table is indexed again so that the assembled wheel is moved to a discharge and inspection station where the wheel is ejected from the fixture by a plurality of circumferentially spaced ejector pins which are elevated by a fluid cylinder for pressing the wheel upwardly from the table fixture.

The entire apparatus of the invention is automatically controlled, and while the oriented spokes of one wheel are being automatically secured to a surrounding rim, the spokes of another wheel are being automatically oriented and positioned, while simultaneously the hub, spokes and rim for the next wheel are being loaded onto one of the table fixtures.

Other features and advantages of the invention will be apparent from the following description, the accompanying drawings and the appended claims.

BRIEF DESCRIPTION OF THE DRAWINGS

FIG. 1 is a perspective view of apparatus constructed in accordance with the invention for automatically assembling a bicycle wheel;

FIG. 2 is a fragmentary perspective view of an assembled bicycle wheel;

FIG. 3 is a fragmentary section taken generally on the line 3 — 3 of FIG. 2;

FIG. 4 is an axial section of one of the transfer table fixtures shown in FIG. 1;

FIG. 5 is an axial section of the lower portion of the spoke orienting mechanism shown in FIG. 1 and illustrating its relative position spaced above a table transfer fixture;

FIG. 6 is a fragmentary view of a table fixture taken generally on the line 6 — 6 of FIG. 4.

FIG. 7 is a fragmentary view of a section taken generally on the line 7 — 7 of FIG. 5;

DESCRIPTION OF THE PREFERRED EMBODIMENT

Figure 8:
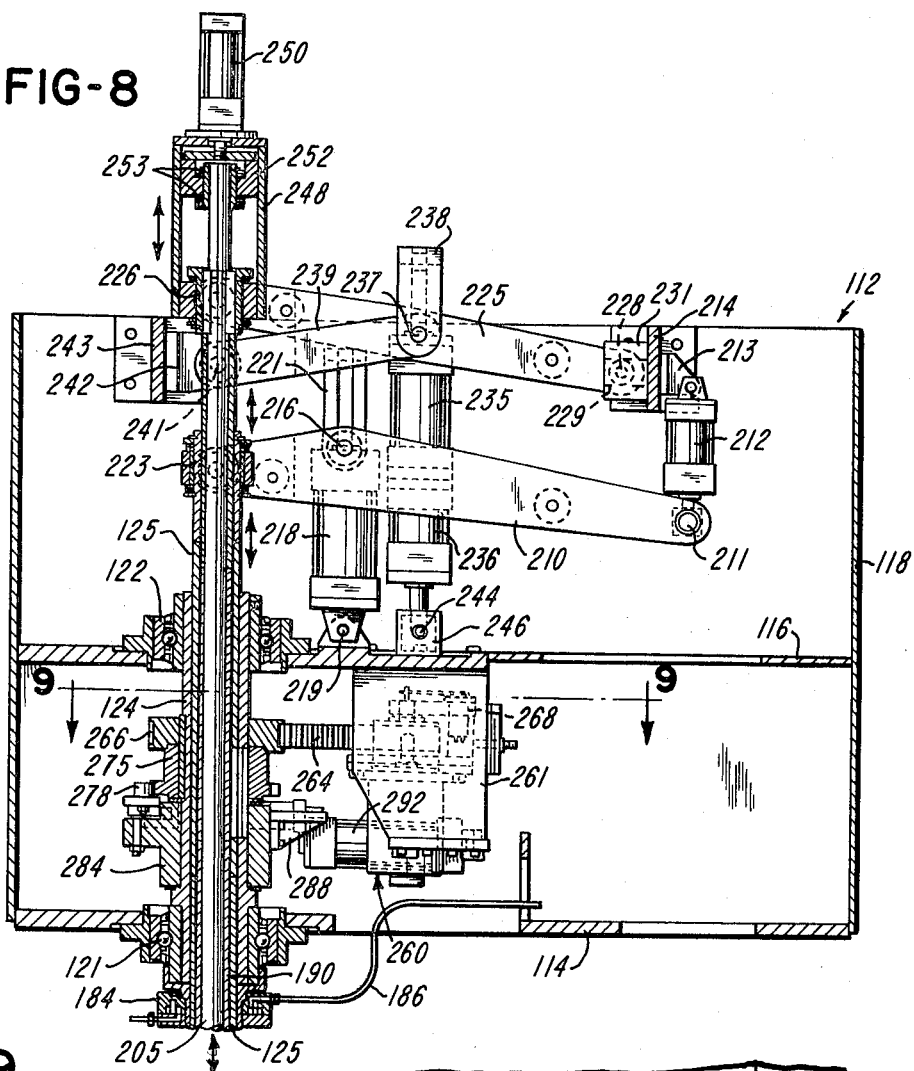
FIG. 8 is an axial section of the upper control and actuating portion of the spoke orienting mechanism and forming an extension of the portion shown in FIG. 5, on a slightly smaller scale.

The wheel assembly machine shown in FIG. 1 is particularly constructed for automatically assembling a bicycle wheel 20 (FIG. 2) which includes an annular rim 22 having a generally U-shaped cross-sectional configuration as shown in FIG. 3. The rim 22 has a series of circumferentially spaced spoke connecting holes 23 which are alternately offset slightly from the center of the rim 22 as shown in FIG. 3. The rim 22 also has a large hole 24 (FIG. 4) for receiving a valve stem (not shown). The wheel 20 further includes a fabricated tubular metal hub 25 having parallel spaced end flanges 26 each having a series of fourteen circumferentially spaced holes 28. The holes 28 within one flange 26 are centered between the holes 28 within the other flange when the hub is viewed axially. A threaded axle 30 extends through the hub 25 and is rotatably supported within the hub by a pair of antifriction ball bearings (not shown) retained by a set of lock nuts 32.

A series of wire spokes 35 extend between the hub 25 and the rim 22, and each spoke 35 has an L-shaped headed end portion 36 which extends through one of the holes 28 in one of the hub flanges 26. The spokes 35 have outer threaded end portions 38 (FIG. 3) which converge to the rim 22 and are connected by slotted head nuts or nipples 40 extending through the corresponding rim holes 23. As shown in FIG. 2, one group of spokes 35 extend generally tangentially in one direction from the inner faces of the hub flanges 26 and are herein referred to as the inner spokes. Another group of spokes 35 extend tangentially from the outer faces of the hub flanges 26 and in the opposite direction from the inner spokes, and are herein referred to as the outer spokes. Thus the outer spokes extending from each hub flange cross the inner spokes extending from the flange. In addition, the holes 28 within one of the hub flanges, are arranged or located between the holes 28 in the other hub flange, as mentioned above, so that the outer end portions 38 of the spokes 35 connect with the rim 22 in an alternating uniformly spaced manner.

Referring to FIG. 1, a wheel assembly machine constructed in accordance with the invention, includes a fabricated metal base frame 42 which supports a circular transfer table 45 for rotation on a vertical center axis. The transfer table 45 is indexed by an indexing drive unit, diagramatically shown as 46, which is mounted on the frame 42 and located under the table 45. A series of four circular openings 48 (FIG. 4) are formed within the table 45 in uniform angularly spaced relation, and a wheel support fixture 50 is mounted within each of the openings 48. While only four equally spaced fixtures 50 are mounted within the transfer table 45 shown in FIG. 1, it is to be understood that more or less fixtures may be used.

Each of the wheel support fixtures 50 includes an annular housing 52 (FIG. 4) which seats within the corresponding opening 48 and is secured to the table 45 by a series of circumferentially spaced bolts 53. A fixture ring 55 is mounted on the housing 52 and has an outer cylindrical surface 56 with a diameter substantially the same as the true inner diameter of the rim 22 so that the rim firmly engages the surface 56 and is held precisely circular.

Referring to FIG. 6, a series of circumferentially spaced sets of holes 58 and 59 extend axially into the fixture ring 55, and each set of holes 58 and 59 are intersected by a radially extending slot 60 for receiving the outer end portion of a spoke which is retained by a spring clip 61 located within the hole 58. Also recessed within the fixture ring 55 is a U-shaped fitting 63 (FIG. 6) which supports a radially outwardly projecting pin 64. The pin 64 projects through the valve stem hole 24 within the rim 22 and thereby orients the rim 22 so that the rim holes 23 align with the slots 60 within the fixture ring. The fitting 63 is supported by a set of vertically spaced links 66 (FIG. 4) which are pivotally connected to a U-shaped fitting 67 secured to the fixture ring 55. The links 66 provide for parallelogram movement of the fitting 63 upwardly and inwardly relative to the fitting 67 to provide for retracting the locating pin 64 from the valve stem holes 24 when the rim 22 is raised from the fixture ring 55, as will be explained later.

A series of circumferentially spaced ejector pins 70 are positioned vertically under the rim 22 on the fixture ring 55 and are supported for vertical movement by a corresponding series of tubular bushings 72 each having an upper flange secured to the housing 52. The pins 70 extend into aligned holes formed within the fixture ring 55 and have enlarged tapered lower end portions 73. A compression spring 74 surrounds each of the tubular bushings 72 and engages the lower end portion 73 of the corresponding ejector pin 70 to retain the ejecting pin in a normally retracted position as shown in FIG. 4.

A pan-shaped lower housing 76 is secured to the upper housing 52 and has a series of holes 77 for receiving the ejector pin bushings 72 and the surrounding compression springs 74. A bushing 78 is located within the center of the lower housing 76 and supports a tubular shaft 80 having an axis common with the axis of the cylindrical surface 56 on the fixture ring 55. A head assembly 82 is mounted on the upper end of the shaft 80 and includes a collet housing 83 supporting a collet chuck 84 which is movable axially within the housing 83 by a fluid clamping cylinder 85 mounted on the lower end portion of the shaft 80 and connected to the collet chuck 84 by a rod 86. A spring biased spoke support cone 88 surrounds the collet housing 83 and defines a chamber 89 which provides for downward axial movement of the support cone 88 on the collet housing 83 in response to pneumatic pressure supplied to the support cone 88 through a flexible line 92 connected by fittings 93 to a solenoid actuated valve 95.

The tubular shaft 80 and the head assembly 82 of each wheel support fixture 50, are movable axially or vertically as a unit between a retracted position (FIG. 4) and an extended or elevated position (FIG. 5). A spring biased detent roller 96 (FIG. 4) is adapted to engage either one or two cavities 97 within the tubular shaft 80 to retain the shaft 80 in either its elevated or retracted position.

Air is supplied to the collet actuating cylinder 85 and the valve 95 of each fixture 50 through a stationary conduit 98 (FIG. 1) which extends from the base frame 42 to the center of the transfer table 45. A rotary seal 100 is mounted on the hub of the transfer table 45 and connects the air supply conduit 98 to the air supply lines which extend to the cylinders 85 and valves 95 of the support fixtures 50. In addition, electrical control lines (not shown) for selectively actuating the solenoid valves 95, extend through the conduit 98 and rotary contacts located within the hub of the transfer table 45. The vertical movement of the head assembly 82 is controlled by actuation of a fluid cylinder 105 which is located below the transfer table 45. As illustrated in FIG. 5, the collet chuck 84 is adapted to receive and grip the lower end portion of the axle 30, and the upper end surface of the spoke support cone 88 forms a seat for the adjacent lower flange 26 of the wheel hub 25.

A spoke orienting mechanism or device 110 (FIG. 1) is supported by the base frame 42 above the cylinder 105 and includes an inverted L-shaped fabricated metal frame or housing 112 which projects inwardly above the transfer table 45. As will be explained later, the spoke orienting device 110 defines a station where the spokes 35 are oriented angularly after the spokes are laced through the holes 28 within the hub flanges 26. The housing 112 of the spoke orienting device 110, includes a lower support plate 114 (FIG. 8) and an inner support plate 116 rigidly connected by a box-shaped sidewall 118. A set of antifriction bearings 121 and 122 are mounted on the plates 114 and 116, respectively and rotatably support a tubular sleeve 124 in which a main support tube 125 is mounted for axially sliding movement. A flange 127 (FIG. 5) is formed on the lower end portion of the support tube 125, and a gear 128 is rigidly secured to the flange 127.

A spoke orienting head assembly 130 (FIG. 5) includes a housing 132 which is rotatably mounted on the lower end portion of the main support tube 125 and is confined between the bottom flange 127 and a bearing collar 133 rigidly secured to the support tube 125. The housing 132 includes a lower ring or annular portion 136 which has a plurality of circumferentially spaced inwardly projecting upper fingers 138 (FIG. 7) each supporting a short cylindrical permanent bar magnet 140. An inverted V-shaped guide fork 141 projects downwardly from the inner end of each finger 138.

An annular plate 142 is mounted on the lower end of the housing portion 136 and also has a plurality of circumferentially spaced and inwardly projecting lower fingers 143 in which are inserted corresponding series of permanent magnets 140. Thus there are seven uniformly spaced upper fingers 138 supporting an upper level of magnets 140 and seven uniformly spaced lower fingers 143 supporting the lower level of magnets 140. Each of the fingers 143 supports a spoke guide fork 141 in the same manner as the fingers 138.

A spoke orienting inner housing or ring member 150 is supported concentrically within the lower housing portion 136 by a plurality of peripherally spaced bearing shoes 151 which engage a circumferentially extending track 152 on the ring member. A series of seven uniformly spaced fingers 154 (FIGS. 5 and 7) project inwardly above another series of seven uniformly spaced fingers 156. Each of the fingers 154 and 156 carries a bar type permanent magnet 140 and a spoke guide fork 141 in the same manner as the fingers 138 and 142. As shown in FIG. 7, the four levels of fingers 138, 143, 154 and 156 are arranged so that all 28 fingers are uniformly spaced around the axis of the head assembly 130 even though the fingers are arranged on four different levels.

A ring gear 159 (FIGS. 5 and 7) extends around the inner housing member 150 and is engaged by two pinions 161 spaced 180° apart. Each pinion 161 is mounted on the lower end of a vertical shaft 162 rotatably supported by upper and lower bearing support members 163 and 164. A pulley 167 is mounted on the upper end portion of each shaft 162 and is driven by a gear belt 168 which extends around a larger diameter pulley 169 mounted on a corresponding vertical stub shaft 171 rotatably supported by bearings in the housing 132 and in the bearing support member 163. A pinion 172 is mounted on each of the shafts 171 and engages the gear 128 which is secured to the lower end flange 127 of the main head support tube 125.

Two fluid or hydraulic motors or rotary actuators 175, spaced 180° apart, are mounted on the housing 132 and drive pinions 176 which engage the gear 128. Thus operation of the actuator 175 is effective to rotate the head 130 in one direction on the support tube 125 while the ring member 150 is rotated in the opposite direction. Stop members 178 are formed as an integral part of the pinion 176 and is adapted to engage rubber bumpers on a set of adjustment screws 179 for adjusting the limits of relative rotation between the housing 132 and the ring member 150. Hydraulic fluid is supplied to the actuator 175 through a flexible line 182 which connects with a rotary seal member 183 mounted on the head support tube 125. The rotary seal member 183 engages a stationary annular seat member 184 which receives a hydraulic fluid supply from a line 186.

Another support tube 190 (FIG. 5) extends within the head support tube 125 and is keyed for axially sliding movement. The support tube 190 has a lower peripheral flange 192 which is secured to a circular transfer disc 195 having a series of angularly spaced holes or openings 196 (FIG. 7) which serve to reduce the mass and inertia of the transfer disc 195. A series of bar-type permanent magnets 198 are spaced uniformly around the periphery of the transfer disc 195 and are arranged in nearly radial alignment with the corresponding magnets 140 supported by the fingers 138, 143, 154 and 156.

A solid shaft 205 is keyed for axially sliding movement within the transfer disc support tube 190, and a wheel hub drive member 206 is mounted on the lower end portion of the shaft 205 for engaging the upper flange 26 of the wheel hub 25, as will be explained later. The hub drive member 206 includes a pilot bore 207 for rotatably receiving the upper end portion of the axle 30.

Referring to FIG. 8, the vertical movement of the spoke orienting head 130 is controlled by pivotal movement of a lever 210 pivotally connected by a pin 211 to the piston rod of a fluid hydraulic cylinder 212 which is pivotally connected to a bracket 213 secured to a cross member 214 of the support housing 112. The lever 210 is also pivotally connected by a pin 216 to the piston rod of a hydraulic cylinder 218 pivotally connected by a pin 219 to the inner plate 116 of the housing 112. A U-shaped bracket 221 allows the lever plates 210 to clear the sides of the cylinder in the down position. A rotary thrust and radial bearing 223 is mounted on the upper end portion of the head support tube 125 and is pivotally connected to the adjacent end of the lever 210.

The transfer disc support tube 190 is moved vertically by a lever 225 which has one end pivotally connected to a rotary thrust bearing 226 mounted on the upper end portion of the support tube 190. The opposite end of the lever 225 is pivotally supported by a pin 228 which is slidably mounted within horizontally extending tracks 229 formed within a bracket 231 secured to the cross member 214 of the housing 112. A set of aligned and rigidly connected hydraulic cylinders 235 and 236 are pivotally connected by a pin 237 to the lever 225. The "U" shaped bracket 238 allows the lever plates 225 to clear the sides of the fluid cylinder 235 in the down position. The other end of the arm 239 is pivotally connected by a pin 241 to a bracket 242 secured to a cross beam 243 of the housing 112. A pin 244 pivotally connects the piston rod of the hydraulic cylinder 235 to a bracket 246 secured to the housing plate 116.

A tube 248 has its lower end portion rigidly secured to the rotary thrust bearing 226, and a hydraulic cylinder 250 is mounted on the upper end of the tube 248. The cylinder 250 has a piston rod which is secured to a collar 252 slidably mounted within tube 248 and connected to the upper end of the shaft 205 by a pair of rotary thrust bearings 253. Thus actuation of the cylinder 250 is effective to produce axial movement of the support tube 190 with respect to the head support tube 125 and the solid shaft 205. This results in axial motion of the spoke transfer disc 195 with respect to the orienting head 132 and driver 206. Axial movement of the head support tube 125 within the tubular sleeve 124, is produced by selective actuation of hydraulic cylinder 212 and 218.

Figure 9:
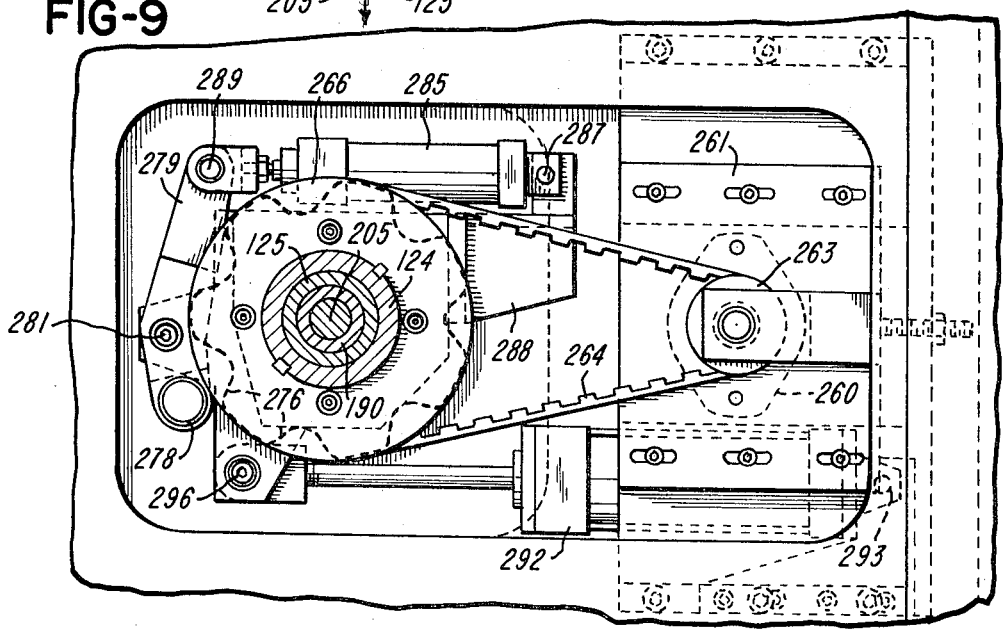
FIG. 9 is a fragmentary section taken generally on line 9 — 9 of FIG. 8.

As shown in FIGS. 8 and 9, the spoke orienting head assembly 130 and its support tube 125 are rotated or driven by a hydraulic motor 260 which is supported by a bracket 261 adjustably mounted on the inner plate 116 of the housing 112. A pulley 263 is mounted on the shaft of the motor 260 and drives an endless gear belt 264 which extends around a larger diameter pulley 266 mounted on the tubular sleeve 124 which is keyed to the head support tube 125. The speed of the motor 260 is sensed by a sensing unit 268 (FIG. 8) which is connected to control a suitable visual display device (not shown).

An index collar 275 (FIG. 8) is mounted on the tube support sleeve 124 directly below the pulley 266 and has a plurality of peripherally spaced curved detent notches 276 which are adapted to receive a follower or roller 278. The roller 278 is mounted on a lever 279 pivotally supported by a pin 281 projecting upwardly from a collar 284 rotatably mounted on the tubular support sleeve 124. A fluid cylinder 285 (FIG. 9) is pivotally connected by a pin 287 to a bracket 288 which is secured to the collar 284, and a pin 289 pivotally connects the piston rod of the cylinder 285 (FIG. 9) to an end portion of the lever 279. Another hydraulic cylinder 292 (FIG. 9) is pivotally connected to the bracket 261 by a pin 293 and has a piston rod which is pivotally connected by a pin 296 to the collar 284. By extending the piston rod of the cylinder 285, the roller 278 is urged inwardly into the adjacent notch 276 thereby locking the spoke orienting head 130 against angular rotation relative to the collar 284 and the tubular support shaft 124. Actuation of the cylinder 292 is then effective to rotate the spoke orienting head 130 for precisely orienting the head 130 angularly with respect to the frame 112 and the rim support fixture 50 located directly below the spoke orienting head.

The spoke orienting device 110 functions in the following maner. As mentioned above, a rim 22 is mounted on one of the transfer table fixtures 50 located at the loading station which is adjacent the operator shown in FIG. 1. After a set of spokes are laced into the hub flange holes 28, the hub and axle assembly are positioned so that the lower hub flange rests upon the upper end of the upwardly biased spoke support cone 88, and the lower end portion of the axle is gripped by the collet chuck 84. The spokes 38 depend or hang downwardly from the hub 25 and rest upon the cone 88. When the transfer table 45 indexes 90°, the fixtured rim 22 and concentrically supported hub 25 and spokes 35 are moved to the spoke orienting station where the spoke orienting device 110 is located.

At this latter station, the air cylinder 105 is actuated to hold the hub support head assembly 82 in its up position, and the normally extending piston rod of the hydraulic cylinder 236 is retracted (FIG. 8) to lower the shaft 205 downwardly until the driving hub 206 (FIG. 5) engages the spokes extending from the upper flange portion of the wheel hub 25, and the bore 207 receives the upwardly projecting end portion of the axle 30. Cylinder 285 (FIG. 5) is then activated to retract the roller 278 from the locating cam 275, and the spoke locating cone member 88 is shifted downwardly by a fraction of an inch. The fixture head collet 84 continues to support the lower end portion of the axle 30 which does not rotate during the spoke orienting cycle.

The entire spoke orienting head assembly 130 is then rotated by actuating the hydraulic motor 260 until the head assembly 130, the hub 25 and the spokes 35 are spinning at a predetermined speed of approximately 600 rpm. At this speed, all of the spokes 35 extend centrifugally outwardly in a uniform angularly spaced relation from the hub flanges 26, and the paths of the spokes define four radial planes (FIG. 5) corresponding to the inner and outer faces of the hub flanges 26.

While the head assembly 130 and the hub 25 and spokes 35 are spinning, the hydraulic cylinder 218 is actuated to lower the orienting head 130 so that the spokes 35 move into the housing portion 136. Cylinder 212 is extended and retracted so that the spokes 35 are engaged by the corresponding magnets 140 supported by the fingers 138, 143, 154 and 156. As mentioned above, the arrangement of the magnets 140 within the four different levels of the fingers, corresponds to the four levels defined by the inner and outer faces of the hub flanges 26 from which the spokes extend.

In addition, each spoke hole is in a unique position about the axis of the hub. That is, since no two holes are superimposed when viewed along the hub axis, the spokes correspondingly, when spinning, are not only arranged in four planes perpendicular to the hub axis, but each spoke is in unique position rotationally about the hub so that all of the spokes are visible and accessible from their outer ends without interference. The magnets 140 are correspondingly positioned.

After the spokes 35 are picked up by the magnets 140, the hydraulic motor 260 is turned off, and the orienting head 130 decellerates until it stops. The rotary actuators 175 are then operated to cause rotation of the ring member 150 by approximately 170° within the housing portion 136. This relative rotation causes the spokes 35 projecting from the inner faces of the hub flanges 26, to cross the spokes 35 projecting from the outer faces of the hub flanges so that the inner group of spokes 35 project tangentially in the opposite direction from the hub flanges than the outer group of spokes.

After the inner group of spokes 35 extending from the inner faces of the hub flanges 26, are crossed relative to the spokes extending from the outer faces of the hub flanges 26, the fluid cylinder 285 is extended to urge the follower or roller 278 into one of the cam notches 276. Cylinder 292 is then slowly moved to its fully extended position to index the orienting head assembly 130 angularly to an accurate final position where the outer end portions of the crossed orientated spokes 35 are aligned vertically with the corresponding slots 60 within the table support fixture 50 located below the orienting head 130. The cylinder 250 is then actuated so that the transfer disc 190 moves downwardly on the shaft 205 causing the magnets 198 on the transfer disc 190 to engage and strip off the spokes 35 from the magnets 140.

The fluid cylinder 235 is actuated to move the shaft 205, drive hub 206 and the transfer disc 190 downwardly as a unit into the underlying table fixture 50. As this unit moves downwardly, the hub assembly of the table fixture 50 is pressed downwardly to its retracted position shown in FIG. 4. As the orientated spokes 35 enter the corresponding slots 60 (FIG. 6) within the ring member 55 of the table fixture 50, the spokes snap into the spring retaining clips 61 located within the holes 58. The spring clips 61 are positioned so that as they receive the spokes 35 being transferred by the disc 190, the spokes are tilted into outwardly converging relation in alignment with the corresponding holes 23 within the rim 22. The cylinder 235 is actuated to retract the shaft 205 and transfer disc 190 upwardly ready for receiving the next succeeding hub and axle assembly along with the loosely connected depending inner and outer groups of spokes 35.

Figure 10:
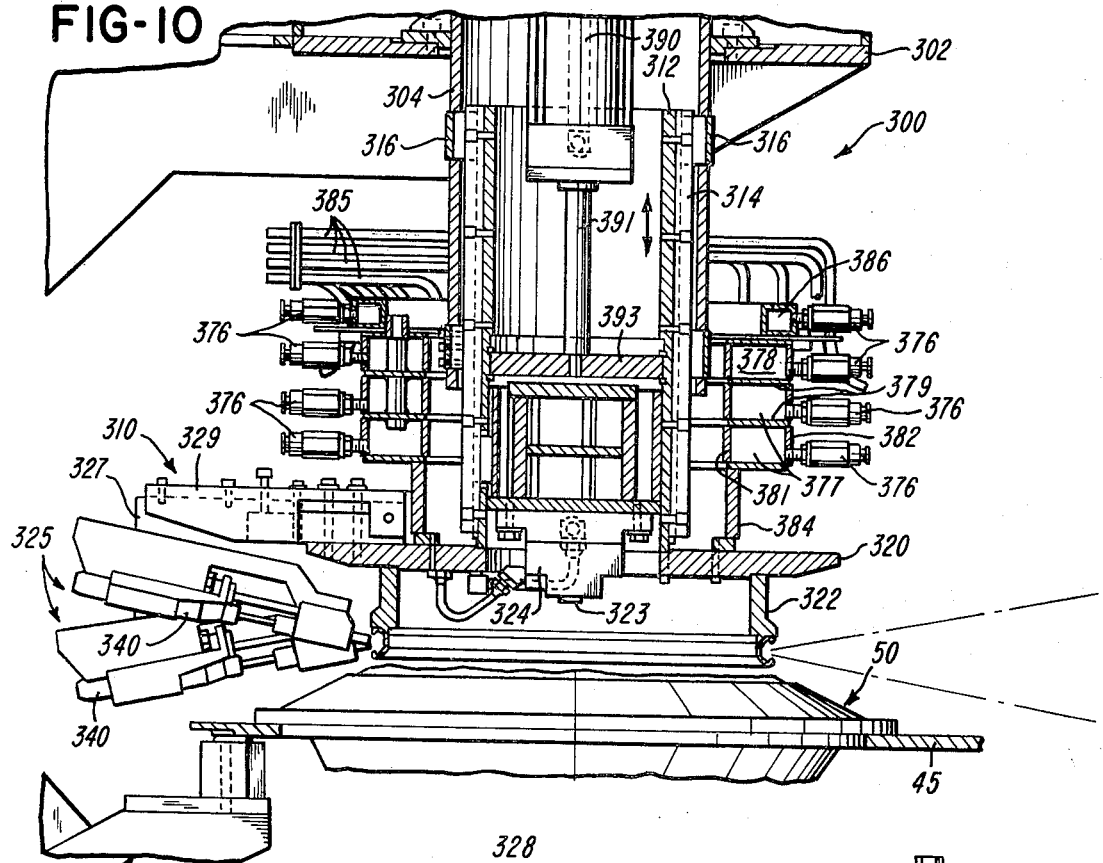
FIG. 10 is a fragmentary axial section of the spoke and rim fastening mechanism shown in FIG. 1.

Referring again to FIG. 1, the wheel assembly machine includes a spoke fastening mechanism or device 300 which is supported by the base frame 42 and defines a spoke fastening station located 180° from the hub and spokes loading station and 90° from the spoke orienting station. The spoke fastening device 300 includes a generally C-shaped frame or housing 302 (FIG. 1) which rigidly supports a vertical guide tube 304 (FIG. 10) above the path of the support fixtures 50 on the transfer table 45. A spoke fastening head 310 includes a support tube 312 which is slidably mounted within the guide tube 304 by a set of peripherally spaced axially extending tracks 314 which receive corresponding guide blocks 316 secured to the guide tube 304.

An annular disc-like plate 320 is secured to the lower end portion of the support tube 312 and supports a cylindrical fixture ring 322 having a bottom surface contour for engaging the rim 22 mounted on the table fixture 50 located directly below the head 310. An air actuated collet 323 is supported within the center of the plate 320 by a collet head 324 and engages the upper end portion of the axle 30 when the ring 322 seats on the rim 22.

The plate 320 supports a series of angularly spaced fastener driving units 325, one for each of the spokes 35. The driving units 325 depend from alternately arranged mounting blocks 327 and 328 adjustably secured to corresponding support brackets 329 mounted on the plate 320. Each fastener driving unit 325 is arranged in generally converging relation with the two adjacent driving units, and the longitudinal axis of each driving unit is aligned with the corresponding spoke 35 retained by the fixture ring 55.

Figure 11:
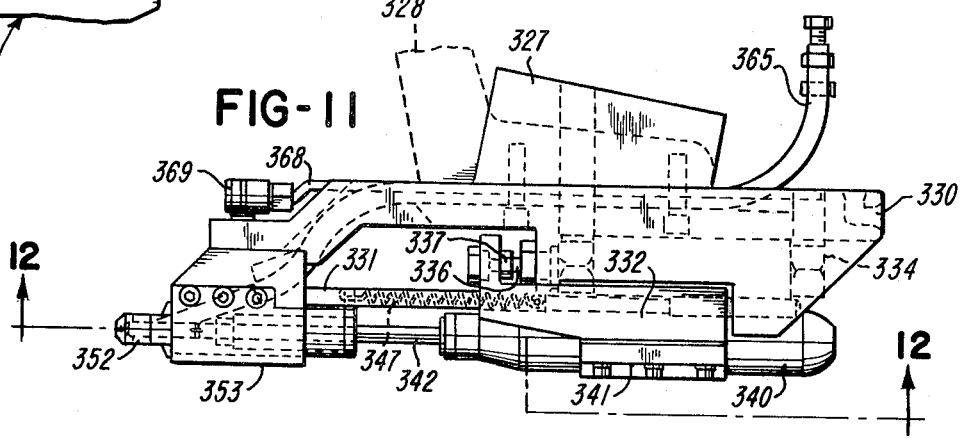
FIG. 11 is an enlarged elevational view of a spoke fastener driving unit.
Figure 12:
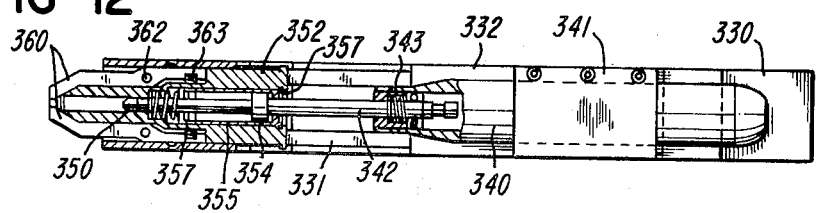
FIG. 12 is a partial section of a spoke fastener driving unit as taken generally on the line 12 — 12 of FIG. 11.

Referring to FIGS. 11 and 12, each of the fastener driving units 325 includes an elongated housing block 330 which supports a pair of guide rods 331. A carriage 332 is slidably mounted on the rods 331, and a fluid cylinder 335 is recessed within the housing block 330, with its piston rod 336 adjustably secured to the carriage 332 by a set of lock nuts 337. A pneumatic motor 340 is secured to the carriage 332 by a clamping bracket 341 and has a drive shaft 342 rotatably supported on its inner end by a thrust bearing 343 (FIG. 12). One form of pneumatic motor 340 which has been found satisfactory, is manufactured by the Rockwell Manufacturing Company and sold as model No. 18F-955B.

The carriage 332 and motor 340 are normally urged to a retracted position (FIG. 11) by a compression spring 347 which extends between the guide rods 331. The forward end portion of the drive shaft 342 supports a screwdriving bit 350 for axial movement within a tubular guide head 352 slidably supported within a housing 353 secured to the forward end portion of a housing block 330. A collar 354 is formed as part of the drive shaft 342 and is slidably mounted within a liner tube 355 located within the slidable head 352. A set of thrust bearings 357 are located at opposite ends of the liner tube 355 and are adapted to be engaged by the collar 354 when the drive shaft 342 is extended or retracted axially by movement of the carriage 332.

A pair of diametrically opposed pincher-like gripping jaws or fingers 360 are pivotally mounted on corresponding pins 361 supported by the head 352 and are biased towards closed positions by a corresponding set of compression springs 363. A succession of threaded fasteners or nipples 40 are supplied to the head 352 of each fastener driving unit 325 through a tube 365 connected to a vibratory hopper (not shown) which receives a supply of nipples. Each nipple 40 is blown through the supply tube 365 and is positioned in front of the screw driving bit 350. The jaws 360 are opened by air which is supplied through an air tube 368 connected to the housing 353 by a fitting 369.

A set of fluid supply lines 372 and 374 (FIG. 1) connect the carriage extension cylinder 334 and the air motor 340 of each fastener driving unit 325, to corresponding fittings 376 which extend into corresponding annular advance and retract manifolds 377 and motor drive manifold 378. The manifolds 377 and 378 are defined by vertically spaced annular plates 379 connecting concentric cylindrical rings 381 and 382 which are supported by a cylindrical base tube 384 mounted on the bottom plate 320 of the head 310. A series of lines 385 (FIG. 10) supply air to the manifolds 377 and 378 and to another annular manifold 386 from which the line 368 extends to actuate the jaws 360. The air supply to each of the manifolds is controlled by a solenoid actuated valve (not shown) within the corresponding air supply line.

The spoke fastener head 310, including the peripherally spaced fastener driving units 325, is movable vertically as a unit in response to actuation of a hydraulic cylinder 390 which is secured to the housing 302 and has a piston rod 391 connected to a circular plate 393 retained within the head support tube 312 above the collet support head 324.

The spoke fastening device 300 operates in the following manner. After a set of spokes 35 are angularly arranged in crossing relation by the spoke orienting device 110 and are transferred to a transfer table fixture 50, the transfer table 45 is indexed 90° to advance the fixture 50, rim 22 and aligned spokes 35 to the spoke fastening device 300 where the axis of the fixture 50 is located in vertical alignment with the axis of the spoke fastening head 310. The hydraulic cylinder 390 is actuated to lower the head 310 until the bottom surface of the locating ring 322 seats on the upper flange of the rim 22 mounted on the fixture 50, and the collet 323 receives the axle 30. Nipples 40 are simultaneously supplied to the driving units 325, and are held in position by the jaws 360. Air is supplied to the advance manifold 377 causing the cylinders 334 to extend, and the screw driver motors 340 are simultaneously energized by air supplied to the manifold 378 when the cylinders 334 start to extend. As each screw driver shaft 342 advances within its corresponding head 352, the corresponding bit 350 engages the nipple 40.

When the collar 354 engages the forward thrust bearing 357, the head 352 advances with the rotating shaft 342. Thus the nipples 40 are simultaneously extended through the corresponding rim holes 23 and are threaded onto the end portions 38 of their corresponding spokes 35. The nipples 40 are simultaneously tightened to a predetermined torque of approximately 4.5 inch pounds by the units 325, at which point the air motors 340 stop. The cylinders 334 are then retracted so that the drive shafts 342 retract with the carriages 332. When the collars 354 engages the rear thrust bearings 357, the heads 352 of the fastener driving units 325 are retracted with the shafts 342 back to their home or normal positions as shown in FIG. 12.

After the spokes are simultaneously secured to the surrounding rim 22 by the fastening nipples 40 to complete the assembly of a wheel, the spoke fastening head 310 is elevated or retracted upwardly by actuation of the hydraulic cylinder 390. The transfer table 45 is then indexed 90° to advance the assembled wheel and its supporting fixture 50 to a discharge station where a pedestal 400 projects outwardly from the base frame 42 for supporting a wheel assembly inspection device (not shown).

An ejector plate (not shown) is located at the discharge station below the transfer table 45 and is supported for vertical movement by actuation of a hydraulic cylinder (not shown). A series of peripherally spaced rods 402 project upwardly from the ejector plate and are adapted to engage the lower ends of the ejector pins 70 within the wheel support fixture 50. When the ejector plate and rods 402 are elevated, the ejector pins 70 press the rim 22 upwardly from the fixture ring 55, thereby releasing the assembled wheel from its supporting fixture 50. The pin 76 within the valve stem hole 24 is automatically retracted when the rim 22 is ejected. The transfer table 45 is indexed again so that the fixture 50 from which the assembled wheel is removed, is advanced to the loading station for receiving another rim 22 and hub sub-assembly including an axle 30 and attached spokes 35.

From the drawings and the above description, it is apparent that a wheel assembly machine constructed in accordance with the present invention, provides desirable features and advantages. Primarily, the machine provides for automatically assembling a wire spoke wheel more rapidly and more efficiently than the manual assembly techniques used heretofore. That is, by spinning the spokes after they are laced through the hub flanges, the spokes are arranged in uniform angularly spaced relation extending generally radially outwardly from the hub flanges in the same direction. The spoke orienting head assembly 130 then provides for engaging the spokes while they are spinning and for shifting or rotating the group of inner spokes in crossing relation to the group of outer spokes so that the groups of crossed spokes extend tangentially from the hub flanges in opposite directions while remaining in uniform angularly spaced relation.

Another important feature of the invention is provided by each support fixture 50 carried by the transfer table 45. That is, each fixture 50 not only provides for transferring a hub and spoke sub-assembly to the spoke orienting device 110, but also provides for positioning the orientated crossed spokes in alignment with the holes 23 within the rim 22. Furthermore, each fixture 50 provides for transferring the orientated and aligned spokes with the surrounding rim to the spoke fastening device 300. As another important feature, the spoke fastening device 300 cooperates with each support fixture 50 for simultaneously assembling all of the fastening nipples 40 onto the ends of the spokes and for tightening the nipples 40 to effect a uniform tension in the spokes 35 as well as a precise circular rim 22.

The control components for operating the transfer table 45, the spoke orienting device 110 and the spoke fastening device 300 have not been described since the use and application of the components would be apparent to a person knowledgeable in fluid and electrical control systems and having the benefit of this disclosure. In general, however, all of the control components are operated from a main control console (FIG. 1) which is located adjacent the loading station, and provide for automatically indexing the transfer table 45 in timed relation with the simultaneous operations of the spoke orienting device 110 and the spoke fastening device 300.

While the method and form of apparatus herein described constitutes a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. Apparatus for assembling a wheel including an annular rim, a hub and a plurality of spokes for connecting the hub to the rim, said apparatus comprising means for spinning the hub on its axis after the inner ends of the spokes are attached to the hub causing the spokes to extend centrifugally outwardly from the hub in a predetermined pattern during rotation of the hub, and orienting means for receiving the spokes in said pattern while the spokes are spinning with the hub and for arranging the spokes in a predetermined relationship with respect to the hub.

2. Apparatus as defined in claim 1 wherein said orienting means is effective to cross a first group of spokes relative to a second group of spokes, and means for aligning the crossed spokes with corresponding holes within the rim.

3. Apparatus as defined in claim 1 wherein said spinning means and said orienting means comprise a rotatable head assembly, and means for rotating said head assembly.

4. Apparatus as defined in claim 3 wherein said head assembly includes a shaft member having an axis coaxial with the rotational axis of said head assembly, said shaft member including means for holding said hub in axial alignment, means for effecting relative axial movement between said shaft member and said orienting means while said head assembly is rotating to effect engagement of the spokes by said spoke orienting means.

5. Apparatus as defined in claim 3 wherein said head assembly includes means for crossing a first group of spokes relative to a second group of spokes, and motor means carried by said head assembly and connected to actuate said spoke crossing means while said head assembly is rotating.

6. Apparatus as defined in claim 1 including a movable transfer table, at least one fixture mounted on said table and including means for retaining the rim, and means concentric with said rim retaining means for supporting the hub with the spokes attached to the hub.

7. Apparatus as defined in claim 6 including means for moving said hub supporting means between a lower retracted position and an upper extended position relative to said rim retaining means.

8. Apparatus as defined in claim 6 wherein said rim retaining means rigidly engages the inner surface of the rim, and means for ejecting the rim from said rim retaining means.

9. Apparatus as defined in claim 8 wherein said fixture includes locating means for engaging a valve stem opening within the rim, and said locating means being movable to a retracted position in response to actuation of said rim ejecting means.

10. Apparatus as defined in claim 6 wherein said fixture includes means for receiving the crossed spokes, and means for transferring the crossed spokes from said spoke orienting means to said spoke receiving means of said fixture.

11. Apparatus as defined in claim 10 wherein said means for spinning the hub and spokes, comprise rotatable head assembly including said spoke orienting means, means for rotating said head assembly, said means for transferring the crossed spokes comprise a transfer member forming part of said head assembly, and means for moving said transfer member axially relative to said orienting means.

12. Apparatus as defined in claim 1 wherein said means for orienting the spokes comprise magnetic members for engaging the spokes, and means for shifting at least some of said magnetic members relative to other magnetic members to effect crossing of one group of spokes relative to another group of spokes.

13. Apparatus as defined in claim 1 and including a series of fastener driving units arranged in angularly spaced relation around the rim, means for successively delivering a supply of threaded fasteners to each said unit, and each said unit including means for extending and rotating each fastener through a corresponding hole within the rim.

14. Apparatus for assembling a wheel including an annular rim, a hub and a plurality of spokes for connecting the hub to the rim, said apparatus comprising means for spinning the hub on its axis after the spokes are attached to the hub causing the spokes to extend centrifugally outwardly from the hub in a predetermined pattern, means for retaining the spokes in said pattern while they are spinning with the hub, means for shifting said retaining means to effect crossing of a first group of spokes relative to a second group of spokes, and means for aligning the crossed spokes in predetermined relation with the rim.

15. Apparatus for assembling a wheel including an annular rim, a hub and a plurality of spokes for connecting the hub to the rim, said apparatus comprising a fixture including means for supporting the rim and hub in concentric relation with the spokes attached to the hub, means for spinning the hub and the attached spokes on the axis of the hub causing the spokes to extend centrifugally outwardly from the hub in a predetermined pattern, means for crossing one group of spokes relative to another group of spokes, and means on said fixture for positioning the crossed spokes in predetermined relation with the rim on said fixture.

16. Apparatus as defined in claim 15 wherein said hub spinning means and said spoke crossing means are located above said fixture, and means for moving said fixture between a first position where said hub supporting means is axially aligned with said hub spinning means and a second position spaced from said first position.

17. Apparatus for assembling a wheel including an annular rim, a hub having axially spaced radial flanges and a plurality of spokes for connecting the hub flanges to the rim, one group of spokes being attached to the hub and extending from the inner surfaces of the flanges and another group of spokes being attached to the hub and extending from the outer surfaces of the flanges, said apparatus comprising means for spinning the hub on its axis with the spokes attached to the hub flanges causing the spokes to extend centrifugally outwardly from the hub flanges in a predetermined pattern, means for engaging the spokes in said pattern while they are spinning with the hub, means for crossing of the one group of spokes relative to the other group of spokes, and means for positioning the crossed spokes in generally outwardly converging relation towards the rim.

18. Apparatus as defined in claim 17 including a plurality of fastener driving units arranged in an annular pattern, means for positioning the fastener driving units in surrounding relation with the rim and with said units substantially aligned with corresponding spokes, and each said unit having means for extending a threaded fastener through a corresponding hole within the rim and for threading the fastener onto the corresponding spoke to a predetermined torque.

19. Apparatus for assembling a wheel including an annular rim, a hub and a plurality of spokes for connecting the hub to the rim, said apparatus comprising means for spinning the hub on its axis with the spokes freely connected to the hub at their inner ends causing the spokes to extend centrifugally outwardly from the hub in a predetermined pattern during rotation, and orienting means for operative association with each such spoke while in said predetermined pattern and while the spokes are spinning with the hub.

20. Apparatus as defined in claim 19 wherein said orienting means is operative to shift the spokes associated therewith from said predetermined pattern into a second desired relationship placing the outer ends of said spokes in positions determined by the characteristics of said rim, and means for connecting said outer spoke ends to said rim to complete the assembly.

21. A method of assembling a wheel including an annular rim, a hub and a plurality of spokes for connecting the hub to the rim comprising the steps of connecting the spokes to the hub, spinning the hub and attached spokes causing the spokes to extend centrifugally outwardly from the hub to locate the outwardly extending spokes in a predetermined pattern, simultaneously crossing a first group of spokes relative to a second group of spokes, positioning the crossed spokes in predetermined relation with the rim, and simultaneously securing the outer end portions of the spokes to the rim.

22. In a method of assembling a wheel having an annular rim, a hub and a plurality of spokes for connecting the hub to the rim, and including the steps of attaching the spokes to the hub, orienting the spokes in a predetermined relation, and securing the spokes to the rim, the improvement comprising the step of spinning the hub on its axis after the spokes are attached to the hub for centrifugally moving the spokes to outwardly extending positions in a substantial uniform angular spaced pattern to facilitate said orienting of the spokes before attachment to the rim.

23. A method of assembling a wheel including an annular rim, a hub and a plurality of spokes for connecting the hub to the rim, comprising the steps of attaching the spokes to the hub, mounting the rim and hub on a fixture, transferring the rim, hub and attached spokes with said fixture to a spoke orienting head, engaging the hub and attached spokes with said orienting head, rotating said orienting head for spinning the hub and attached spokes to extend the spokes centrifugally outwardly from the hub to locate the outwardly extending spokes in a predetermined pattern, crossing a first group of spokes relative to a second group of spokes, transferring the crossed spokes to said fixture, and positioning the crossed spokes in generally outwardly converging relation to the rim on said fixture.

24. A method as defined in claim 22 including the steps of transferring the rim, hub and oriented cross spokes with said fixture to a spoke fastening device, and simultaneously securing the outer end portions of the oriented spokes to the rim with said fastening device.

* * * * *